(12) United States Patent
Fluri et al.

(10) Patent No.: US 12,446,930 B2
(45) Date of Patent: Oct. 21, 2025

(54) DISTAL RADIUS FRACTURE FIXATION DEVICE

(71) Applicant: DISRAD AG, Zürich (CH)

(72) Inventors: Daniel Fluri, Grenchen (CH); Silas Zurschmiede, Bibern (CH); Andreas Schweizer, Zumikon (CH); Ladislav Nagy, Kilchberg (CH)

(73) Assignee: DISRAD AG, Zürich (CH)

( * ) Notice: Subject to any disclaimer, the term of this patent is extended or adjusted under 35 U.S.C. 154(b) by 22 days.

(21) Appl. No.: 17/429,335

(22) PCT Filed: Feb. 8, 2019

(86) PCT No.: PCT/IB2019/051033
§ 371 (c)(1),
(2) Date: Aug. 7, 2021

(87) PCT Pub. No.: WO2020/161525
PCT Pub. Date: Aug. 13, 2020

(65) Prior Publication Data
US 2022/0142685 A1 May 12, 2022

(51) Int. Cl.
*A61B 17/72* (2006.01)
*A61B 17/17* (2006.01)
*A61B 90/00* (2016.01)

(52) U.S. Cl.
CPC ...... *A61B 17/7241* (2013.01); *A61B 17/1725* (2013.01); *A61B 90/03* (2016.02); *A61B 2090/037* (2016.02)

(58) Field of Classification Search
CPC .................. A61B 17/1725; A61B 17/72–7291
See application file for complete search history.

(56) References Cited

U.S. PATENT DOCUMENTS

| | | | |
|---|---|---|---|
| 6,379,359 B1 * | 4/2002 | Dahners | A61B 17/72 606/62 |
| 6,527,775 B1 * | 3/2003 | Warburton | A61B 17/164 606/62 |

(Continued)

FOREIGN PATENT DOCUMENTS

| | | |
|---|---|---|
| CN | 101040796 A | 9/2007 |
| CN | 101043854 A | 9/2007 |
| CN | 102083374 A | 6/2011 |

OTHER PUBLICATIONS

European Office Action issued in corresponding application No. 19710485.4, dated Sep. 6, 2023.

(Continued)

*Primary Examiner* — Eduardo C Robert
*Assistant Examiner* — Steven J Cotroneo
(74) *Attorney, Agent, or Firm* — Maschoff Brennan

(57) ABSTRACT

The invention concerns a distal radius fracture fixation device for securing at least two fractured bone segments together. The device comprises: a body portion comprising at least two insertion channels each extending through the body portion and each being configured for receiving a bone fixation element therethrough; and an insertion device connection portion connected to the body portion, and for coupling a separate insertion device to the fracture fixation device. The insertion device connection portion is arranged to be decoupled from the body portion.

23 Claims, 7 Drawing Sheets

(56) References Cited

U.S. PATENT DOCUMENTS

| | | | |
|---|---|---|---|
| 7,588,577 B2 | 9/2009 | Fencl et al. | |
| 7,771,433 B2 | 8/2010 | Orbay et al. | |
| 8,152,807 B2 | 4/2012 | Edwards et al. | |
| 8,216,238 B2* | 7/2012 | Medoff | A61B 17/1782 |
| | | | 606/86 R |
| 11,627,999 B2* | 4/2023 | Fabbri | A61B 17/8802 |
| | | | 606/62 |
| 2003/0073999 A1* | 4/2003 | Putnam | A61B 17/7291 |
| | | | 606/62 |
| 2007/0083202 A1* | 4/2007 | Eli Running | A61B 17/72 |
| | | | 606/62 |
| 2007/0173835 A1 | 7/2007 | Medoff | |
| 2007/0190490 A1* | 8/2007 | Giorno | A61C 13/2656 |
| | | | 433/172 |
| 2008/0269744 A1* | 10/2008 | Kay | A61B 17/1725 |
| | | | 606/62 |
| 2009/0157080 A1 | 6/2009 | Warburton | |
| 2009/0248024 A1* | 10/2009 | Edwards | A61B 17/1739 |
| | | | 606/62 |
| 2009/0292292 A1* | 11/2009 | Fencl | A61B 17/1725 |
| | | | 606/104 |
| 2010/0312244 A1* | 12/2010 | Edwards | A61B 17/1739 |
| | | | 606/62 |
| 2011/0282347 A1* | 11/2011 | Gordon | A61B 17/1725 |
| | | | 606/104 |
| 2014/0066932 A1* | 3/2014 | Appenzeller | A61B 17/72 |
| | | | 606/64 |
| 2014/0276878 A1* | 9/2014 | Metzinger | A61B 17/1725 |
| | | | 606/96 |
| 2018/0140310 A1 | 5/2018 | Machamer et al. | |
| 2018/0271567 A1* | 9/2018 | Schumacher | A61B 17/725 |

OTHER PUBLICATIONS

EP Office Action dated Apr. 9, 2024 as received in Application No. 19710485.4.
CN Office Action dated Jan. 31, 2024 as received in Application No. 201980090262.2.
CN Office Action dated May 24, 2024 as received in Application No. 201980090262.2.
AU Patent Examination Report dated Jul. 18, 2024 as received in Application No. 2019428406.
EP Office Action dated Sep. 13, 2024 as received in Application No. 19710485.4.
CN Notification of Rejection dated Dec. 11, 2024 as received in Application No. 201980090262.2.

* cited by examiner

DISTAL RADIUS FRACTURE FIXATION DEVICE

TECHNICAL FIELD

The present invention relates to a distal radius fracture fixation device, which may be shaped and dimensioned to be at least partially inserted into a medullary canal of a bone, which may be the radius. The present invention also relates to a distal radius fracture fixation assembly comprising the distal radius fracture device and an insertion device.

BACKGROUND OF THE INVENTION

The use of fracture fixation devices, such as intramedullary fixation devices, to secure at least two bone segments together is well known in the orthopaedic field. Intramedullary fixation devices are known which comprise a thick main body portion and optionally a relatively long and curved tail portion, which is arranged to be inserted into a medullary canal of a bone, such as the radius. Bone screws may be provided to fix the intramedullary fixation device to the bone and stabilise the fracture zone.

An insertion instrument is typically provided to bring the fracture fixation device into its implantation location. The insertion instrument needs to be somehow connected to the fracture fixation device such that it can later be disconnected from the fracture fixation device once the fracture fixation device has been implanted. Currently known connecting means are often rather complex and/or the manufacturing process of the connecting means generally also including the fracture fixation device is unnecessarily complicated.

Furthermore, with many of the available fracture fixation devices, a surgeon will have to make multiple skin incisions and drill multiple bone holes to implant the fracture fixation device. This has the disadvantage of resulting in a long and complicated procedure requiring many instruments and resulting in additional morbidity and a longer healing process for the patient.

SUMMARY OF THE INVENTION

It is an object of the present invention to overcome at least some of the problems above relating to fracture fixation devices.

According to a first aspect of the invention, there is provided a fracture fixation device as recited in claim 1.

The proposed fracture fixation device has the advantage that it is very easy to connect an insertion instrument or device to the proposed fracture fixation device. Furthermore, the connection is strong enough, yet the insertion device can be easily decoupled from the fracture fixation device once the fracture fixation device has been implanted and secured. The proposed solution has also the advantage that it is very easy to manufacture the fracture fixation device as the actual insertion device is not integrally formed with the fracture fixation device. Moreover, the solution advantageously leads to only one skin entry point (only one incision) where the fracture fixation device and bone fixation elements, such as bone screws, can easily be placed through.

According to a second aspect of the invention, there is provided a distal radius fracture fixation assembly.

According to a third aspect of the invention, there is provided a method of treating a distal radius fracture.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which.

DETAILED DESCRIPTION OF EMBODIMENTS OF THE INVENTION

Figure 1:
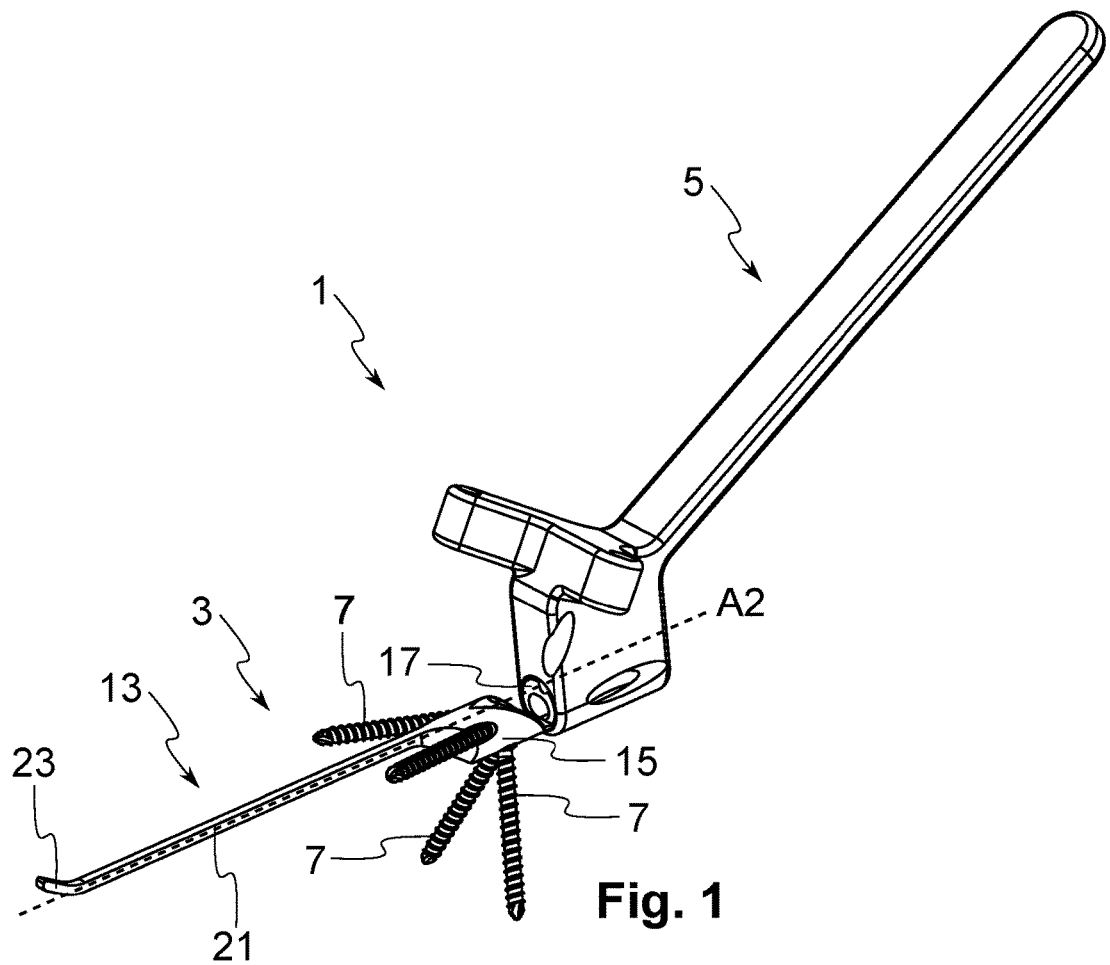
FIG. 1 is an isometric view illustrating the fracture fixation assembly according to a first example embodiment of the present invention.
Figure 2:
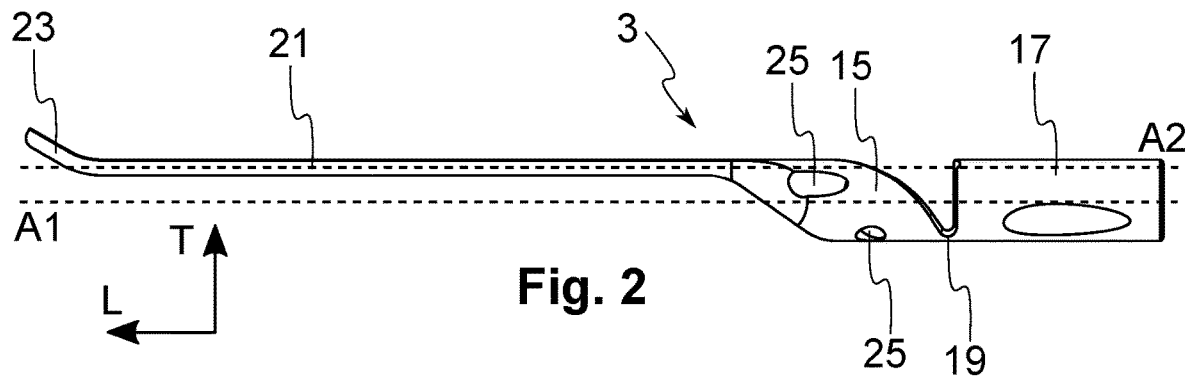
FIG. 2 is a side view of the fracture fixation device according to the first embodiment of the present invention.
Figure 3:
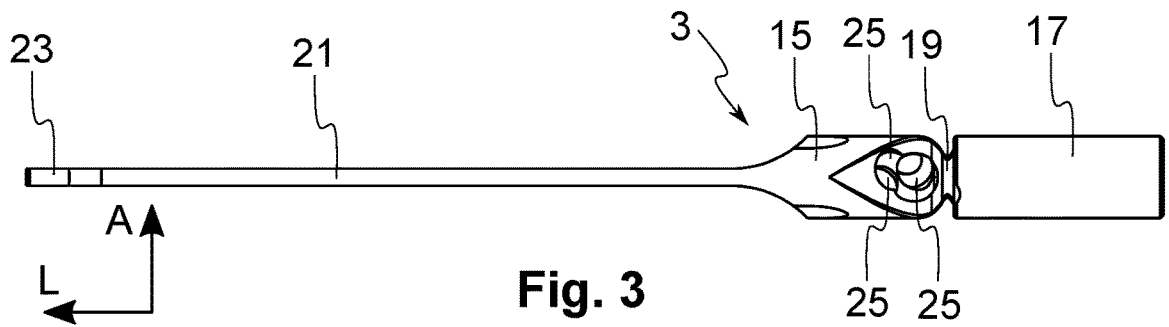
FIG. 3 is a top view of the fracture fixation device of FIG. 2.

Some embodiments of the present invention will now be described in detail with reference to the attached drawings. The embodiments are described in the context of a distal radius fracture fixation device and assembly for bridging at least two bone segments. In one embodiment, the fracture fixation device is an intramedullary fracture fixation device configured to be inserted into a medullary canal or cavity of a bone, such as the radius. However, the teachings of the invention are not limited to this environment or application. Identical or corresponding functional and structural elements which appear in the different drawings are assigned the same reference numerals. As utilised herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning of "include", "contain" or "comprehend".

FIG. 1 illustrates the first example embodiment of the fracture fixation assembly or system 1. The fracture fixation assembly comprises a fracture fixation device or apparatus 3 and an insertion or aiming device or instrument 5, which in this example is a physically separate or independent element. In other words, the fracture fixation assembly is a non-monobloc element. As in the present example the fracture fixation device is configured to be used for treating distal radius fractures, also known as wrist fractures, the device 3 may also be referred to as a distal radius nail. FIG. 1 also shows bone fixation elements 7 connected to the fracture fixation device 3, which in this example are bone screws, but they could for example be nails, pins or partly threaded elements instead. It would be also possible to use both the bone screws and nails with one single fracture fixation device 3. The fracture fixation device is better illustrated in FIGS. 2 to 5 and 7. FIG. 6 shows how the fracture fixation device can be implanted by using the insertion device 5. As can be seen in FIG. 6, at least a part of the fracture fixation device 3 is sized and shaped to extend longitudinally inside a medullary canal 9 of a bone 11, which in this example is the radius bone.

According to this embodiment, the fracture fixation device 3 comprises four distinct parts, sections or portions, namely a tail portion 13, a body or head portion 15, an insertion device connection portion 17 and a bridging or neck portion 19 for connecting the body portion 15 and the insertion device connection portion 17 together. In this example, the fracture fixation device 3 is a monobloc element (monolithically formed as one block of material), i.e. constructed from a single piece. However, this does not have to be the case. For example, the body portion 15 and the insertion device connection portion 17 could be two physically separate elements firmly but removably connected to each other once assembled. In other words, it is possible that the insertion device connection portion 17 is not integrally formed with the body portion 15. The insertion device connection portion 17 could be connected or coupled to the body portion 15 with a press-fit or form-fit connection. For example, one of the portions could have a protrusion or a lip, which is arranged to be received in a cavity of the other portion, optionally in a press-fit or form-fit manner. Other possible connections are for example screw-in or snap-in connections.

As shown in the figures, the fracture fixation device 3 is a longitudinal element such that the body portion 15 has a first central axis A1, while the tail portion 13 has a second central axis A2. Both of these axes extend longitudinally along the respective body. The first and second central axes are substantially parallel but in the first and second embodiments, they are not coaxial. However, the first and second central axes A1, A2 do not have to be parallel. In other words, the first and second central axes A1, A2 may have a non-zero angle between them. A plane containing the respective central axis may be considered to divide the respective body or its cross-section into symmetrical halves.

The tail portion comprises a first tail portion 21 and a second tail portion 23, which in a non-assembled state are both straight portions. The second tail portion is angled with respect to the first tail portion. The angle may be between 100 and 800 or more specifically between 20° and 70° or between 30° and 60°. However, the first and/or second tail portions 21, 23 could instead be curved. Furthermore, the tail portion 13 is made of a flexible material such that in an assembled state (i.e. when implanted), the tail portion may be curved when inside the medullary canal 9. The tail portion 13 is thus shaped and dimensioned to reside within the medullary canal of the radius bone. Thus, the tail portion is configured to be elastically deformable to conform to the shape of the medullary canal 9. The first tail portion 21 combines or merges with the body portion 15 at a first end, which is a distal end, of the tail portion 13, while the second tail portion 23 is located at a second end of the tail portion 13, which is a proximal end. The purpose of the second tail portion 21 is to facilitate the insertion of the fracture fixation device 3 into the medullary canal. However, instead of having the second tail portion angled, the first tail portion could simply have a chamfered or rounded end. In other words, the fracture fixation device may comprise only one tail portion, which optionally has a chamfered or rounded proximal end.

According to one variant of the invention, the tail portion 13 is configured to be removed from the body portion 15 for instance during the surgery if desired. To facilitate the removal, one or more grooves may be provided circumferentially along the outer surface of the tail portion at desired locations where the tail portion can be cut away or snapped off. Instead of the groove(s), the tail portion 13 may comprise any other region(s) with a narrowed diameter compared to the rest of the tail portion. More broadly, the tail portion may comprise at desired locations any number of regions with reduced mechanical strength to facilitate the removal of the tail at these regions.

It is to be noted that instead of the first and second straight tail portions, the fracture fixation device 3 could comprise only one tail portion, which would be curved in this case. The tail portion or even the entire fracture fixation device could be curved within a plane defined by a longitudinal direction L and a vertical or transverse direction T, which is oriented substantially perpendicular to the longitudinal direction L. Additionally, or instead, the fracture fixation device 3 or at least the tail portion 13 could be curved within a plane defined by the longitudinal direction and a lateral direction A, which is substantially perpendicular to the longitudinal and transverse directions. The lateral direction thus coincides with a medial-lateral direction.

In the first embodiment illustrated in FIGS. 1 to 7, the outer surface of the tail portion 13 is substantially smooth and devoid of any threads, such that the fracture fixation device 3 may be considered to be a fracture fixation nail or more specifically an intramedullary nail. According to a variant of the present invention, the tail portion is a threaded element such that the fracture fixation device 3 may be considered to be a fracture fixation screw or pin or more specifically an intramedullary screw or pin. Furthermore, according to the embodiments illustrated in the drawings, the tail portion 13 is not configured to receive any bone fixation elements. In other words, the tail portion is devoid of any insertion channels. This has the advantage that the number of required skin incisions for implanting the fracture fixation device 3 can be minimised. However, a solution in which the tail portion is configured to receive bone fixation elements is not excluded.

In the embodiments illustrated in the figures, the body portion has a substantially tubular shape, i.e. with a substantially circular or elliptical cross section in the plane defined by the lateral and transverse directions (although other cross-sectional shapes are equally possible such as a substantially elliptical or rectangular shape optionally with rounded corners). The cross-sectional area of the body portion is greater than the cross-sectional area of the tail portion 13. Furthermore, the cross section in the plane defined by the longitudinal and transverse directions may have a substantially rhomboid or rhombus shape. In the present embodiment, the insertion device connection portion 17 is a hollow element having at least a longitudinal cavity traversing this element. The body portion may or may not be hollow. The external diameters of the body portion 15 and the insertion device connection portion 17 may be substantially the same.

The body portion 15 comprises a set of insertion channels 25, passages or through holes for receiving a set of bone fixation elements 7, (one bone fixation element per channel). In the present description, the word "channel" is to be interpreted broadly and to mean a passage, which may or may not be enclosed and which may or may not have a tubular shape. In this example, all or some of the channels 25 may comprise a threaded inner surface (having a female thread) to match with the thread of the bone screw 7 (having a male thread). However, the channels could instead have a smooth inner surface devoid of any thread to receive nails or alternatively if bone screws are used, they could form their own thread in the channel surface. Each channel 25 extends between a channel insertion point and a channel exit point. Furthermore, each channel 25 in the set defines a channel axis, which would coincide with a longitudinal axis of the screw (when the screw is received in the channel), which is a central axis of the screw. In this specific example, the body portion 15 comprises four channels 25. Furthermore, in this example, the channel axes are not parallel and are thus oriented all in different directions. However, according to a variant of the invention, this does not have to be the case. For example, at least two of the channel axes could be parallel or if not parallel, they could lie at least in the same plane.

Figure 4:
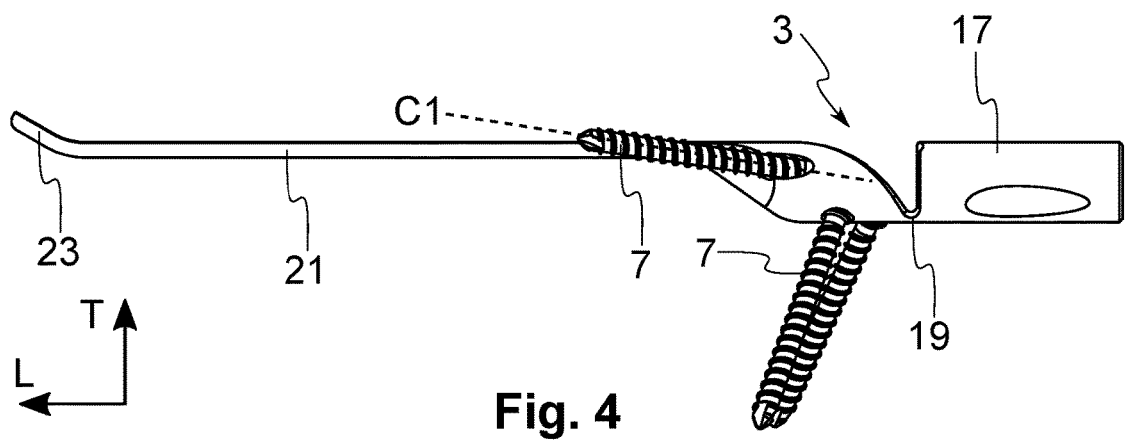
FIG. 4 is a side view of the fracture fixation device of FIG. 2 and further showing bone fixation elements.
Figure 5:
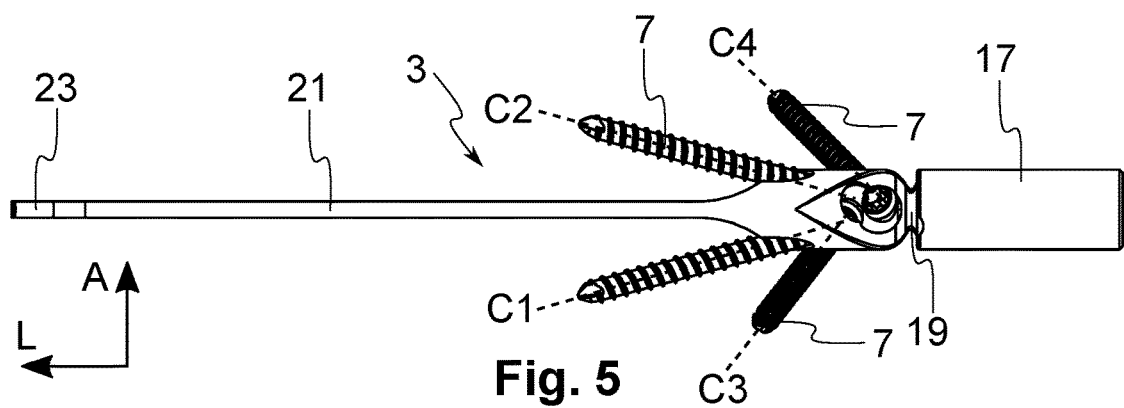
FIG. 5 is a top view of the fracture fixation device of FIG. 4.
Figure 6:
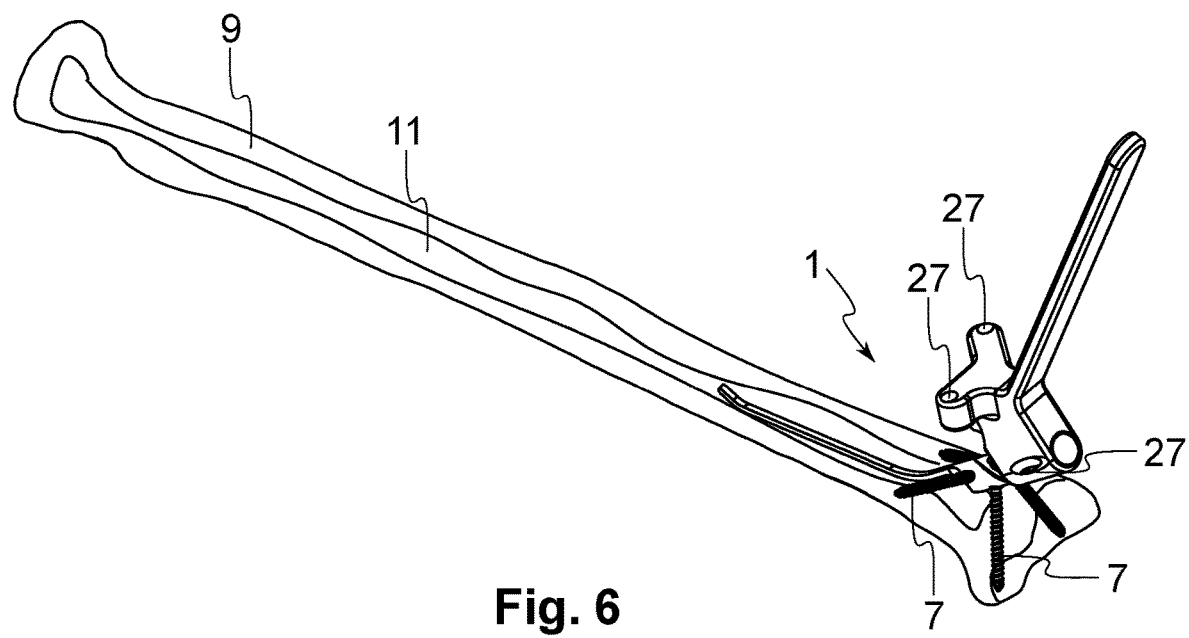
FIG. 6 is an isometric view illustrating the fracture fixation assembly of FIG. 1 when implanting the fracture fixation device into a target bone.
Figure 7:
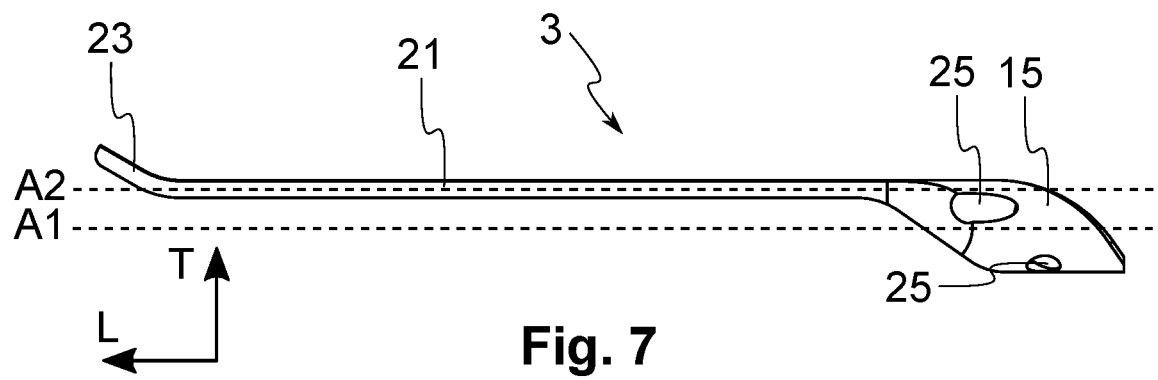
FIG. 7 is a side view of the fracture fixation device of FIG. 2 but without a snap-off element.
Figure 8:
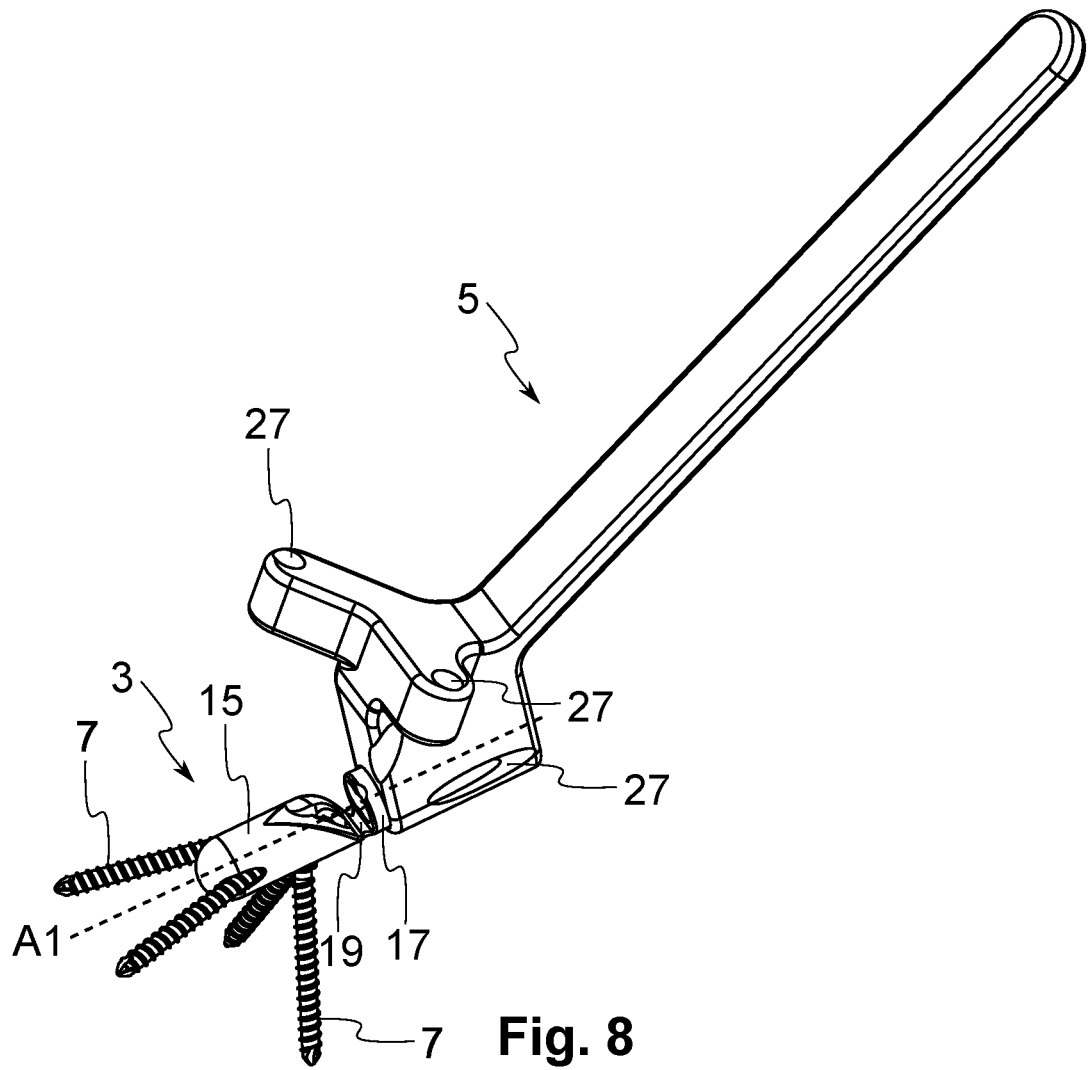
FIG. 8 is an isometric view illustrating the fracture fixation assembly according to a second example embodiment of the present invention.

As mentioned, in the embodiment illustrated in FIGS. 1 to 7, the fracture fixation device 3 comprises four channels 25, namely a first channel defining a first channel axis C1, a second channel defining a second channel axis C2, a third channel defining a third channel axis C3 and a fourth channel defining a fourth channel axis C4. The orientations of these four axes are illustrated in FIG. 5. In the illustrated embodiment, all the four channels have a common channel insertion point. Furthermore, in the illustrated embodiment, all the channel axes extend from the common channel insertion point located at the distal end of the body portion 15 towards the proximal end of the fracture fixation device 3. As further seen for instance in FIG. 5, the channel axes diverge towards the proximal end of the fracture fixation device. In other words, in the illustrated embodiment, all the channel axes C1, C2, C3, C4 diverge in the target bone. As shown in FIG. 4, for example, none of the four channel axes is parallel to the first or second central axes A1, A2 of the fracture fixation device 3. As a matter of fact, all these four axes cross the central axis A1 of the body portion 3 only once. As further shown in FIGS. 4 and 5, the bone screws 7 when received in the first and second channels are arranged to traverse a medial-lateral plane defined by the lateral and longitudinal directions and containing the second central axis A2. The first and second channel axes C1, C2 may have for instance an angle between 0° and 50°, or more specifically between 1° and 20°, or more specifically between 3° and 200 with respect to the medial-lateral plane. The third and fourth channel axes C3, C4 on the other hand, may have an angle for example between 30° and 90°, or more specifically between 40° and 800 or between 50° and 800 with respect to the medial-lateral plane. Furthermore, in the example shown in the figures, all these four channel axes diverge from a vertical plane defined by the longitudinal and transverse directions. The angle between any of these channels and the vertical plane may be for instance between 0° and 60°, or more specifically between 5° and 400 or 100 and 30°.

It is to be noted regarding the number and arrangement of the channels, many variants exist. For instance, the number of channels does not have to be four. Advantageously the number of channels 25 is between two and five. Furthermore, the orientation of the channels may be different compared to the orientations illustrated in FIG. 5. For example, one or more channels could be pointed towards the distal end of the fracture fixation device, i.e. towards the insertion device connection portion 17. According to one specific variant, the fracture fixation device 3 would have three channels optionally arranged such that at least one of the channels would be substantially parallel to the central axis A1 of the body portion 15. According to a further variant, the third and fourth channels would both lie in the vertical plane defined by the longitudinal and transverse directions. Furthermore, in the illustrated embodiment, all the channel insertion and exit points are located in the thickened portion, i.e. in the body portion, but this does not have to be the case. For instance, one or more channels could at least partly extend through the tail portion 13.

As illustrated in the drawings, the insertion device connection portion or element 17 is integrally formed with the body portion 15 via the bridging portion or element 19, which thus forms a bridge or a connecting region between the body portion 15 and the insertion device connection portion 17. The insertion device 5 may be connected or coupled to the insertion device connection portion 17 with a press-fit or form-fit connection. Other possible connections are for example screw-in or snap-in connections. For this purpose, the insertion device 5 comprises an opening, cavity or hole shaped and dimensioned such as to receive at least a portion of the insertion device connection portion 17, optionally substantially completely. Alternatively, or in addition, other connecting means, such as clips, may be provided on the insertion device connection portion 17 and/or on the insertion device 5 to firmly connect these elements together. Furthermore, the insertion device connection portion 17 may comprise one or more stop elements, shoulders or protrusions to rest against the insertion device 5 when it is coupled to the insertion device connection portion 17. In this manner it can be ensured that the insertion device does not move past this stop under any circumstances. Alternatively, or in addition, the insertion device connection portion 17 may have a conical shape such that the diameter of the insertion device connection portion 17 increases towards the bridging portion 19.

Figure 15:
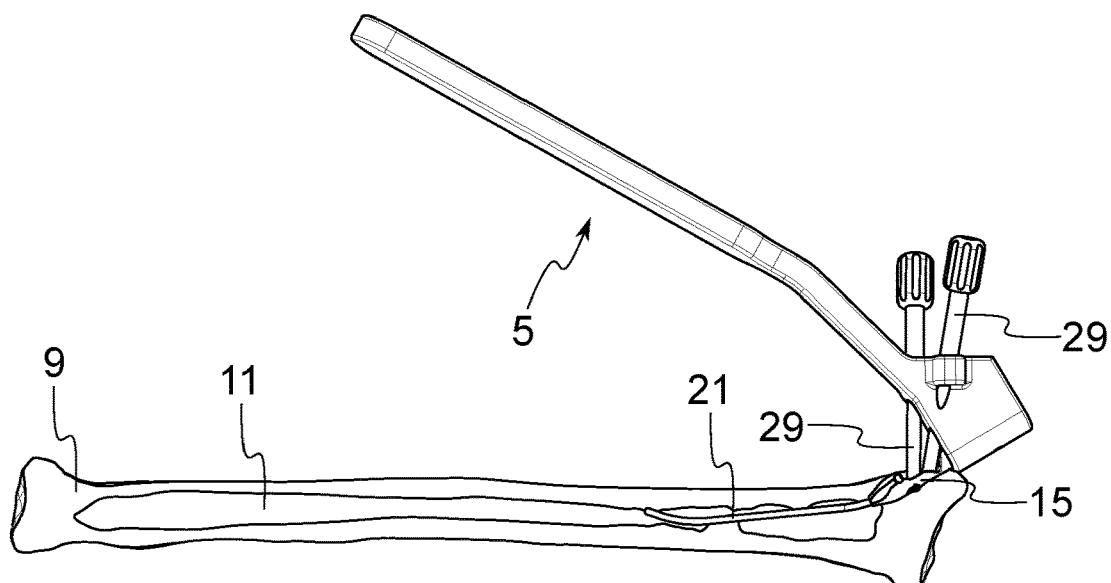
FIG. 15 is a side view illustrating the fracture fixation assembly according to the third embodiment when implanting the fracture fixation device into the target bone.
Figure 16:
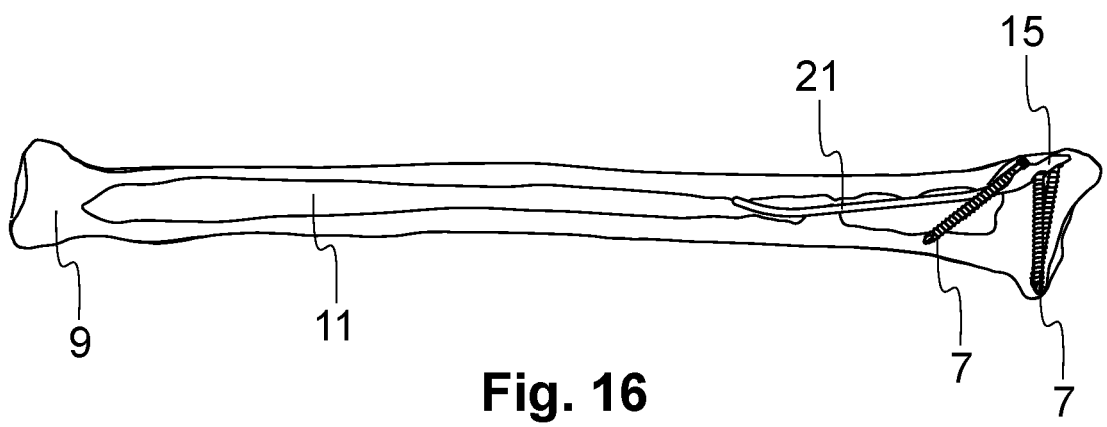
FIG. 16 is a side view of the fracture fixation device according to the third embodiment when implanted in the target bone.

The insertion device 5 further comprises a set of drilling channels 27 for receiving a drilling element or piece or a drill guide (shown in FIG. 15). Advantageously, the number of the drilling channels 27 equals the number of the insertion channels. More specifically, a first drilling channel is aligned with the first insertion channel, a second drilling channel is aligned with the second insertion channel, a third drilling channel is aligned with the third insertion channel, and a fourth drilling channel is aligned with the fourth insertion channel. A drilling element is configured to be received in the drilling channels 27 such that the drilling element can also traverse the corresponding insertion channel 25 to drill a hole into the target bone 9. In the illustrated embodiment, the insertion device connection portion 17 is a hollow element with openings or grooves on its side such that the drilling elements can traverse these openings and extend through the insertion channels to the target bone 9. Once the holes have been drilled or made in the target bone, the bone fixation elements 7 can be inserted and locked into these holes while residing in the insertion channels. In this manner the fracture fixation device 3 can be secured to the target bone. It is to be noted that advantageously at least one of the bone fixation elements 7 is configured to cross a bone fracture line between a first bone segment and a second, different bone segment. The remaining bone fixation elements may remain entirely either in the first or second bone segment.

The insertion device 5 may thus be used to steer or guide the fracture fixation device 3 to its implantation position. For this purpose, the insertion device comprises a handle. Once the fracture fixation device is in its correct position, a force may be applied to the insertion device to decouple the insertion device connection portion 17 together with the insertion device 5 from the body portion 15. The applied force may be linear force and/or rotational force (torque). The bridging portion may for instance be designed so that it can sustain more linear forces than rotational forces before breaking. Thus, once a sufficient force is applied to the insertion device connection portion 17 (through the insertion device), it can be snapped off. For this reason, the insertion device connection portion 17 may also be called a snap-off element or tube. As explained above, the snap-off element is initially rigidly attached to the body portion 15 but it is removed during the surgery. In other words, the snap-off element is not implanted. It is to be noted that the bridging portion 19 may comprise a mechanically weakened region (such as a groove) similar to the above described optional tail arrangement to facilitate the decoupling. The snap-off element and the body portion are optionally secured with a supporting or rigidifying element, such as a drill guide 29 (shown in FIGS. 14 and 15), during the insertion to make the fracture fixation device more rigid and more specifically the connection between the insertion device connection portion and the body portion. The rigidifying elements may be longitudinal and optionally hollow elements linking the insertion device 5 to the body portion 15 to increase the rigidity of the bone fracture fixation device 3.

The bridging portion 19 comprises a set of connection points, which in the present embodiment all lie substantially in a single plane. However, instead, the connection points could be in more than one plane, such that these planes are optionally perpendicular to each other. The length of the bridging portion in the direction of the central axis (or in the length direction L) of the body portion 15 is advantageously kept small to minimise any material protruding from the body portion 15 once the bridging portion has been broken. The length may be in the range of 0.5 mm and 10 mm, or more specifically between 1 mm and 5 mm or 1 mm and 3 mm. The height of the bridging portion in the transverse direction T may be for example at most half of the length, or more specifically at most one third of the length or at most one fourth of the length. Furthermore, the width of the bridging portion in the lateral direction A may be at least double the length or more specifically at least three times the length or fourth times the length, however, advantageously always less than the width of the body portion 15 in the lateral direction A.

Figure 9:
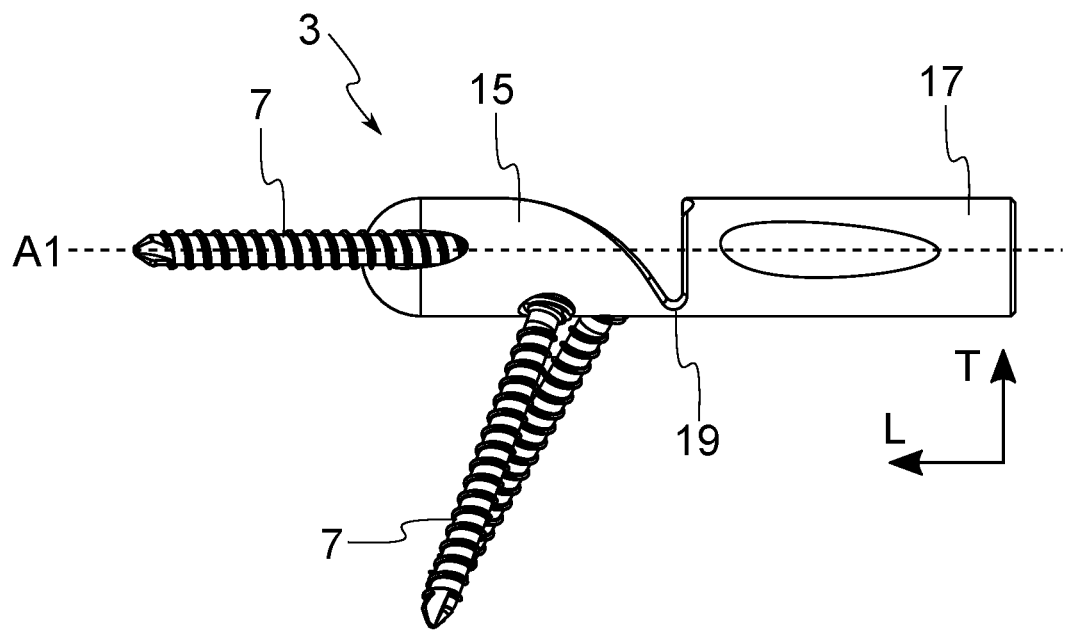
FIG. 9 is a side view of the fracture fixation device according to the second embodiment and further showing bone fixation elements.
Figure 10:
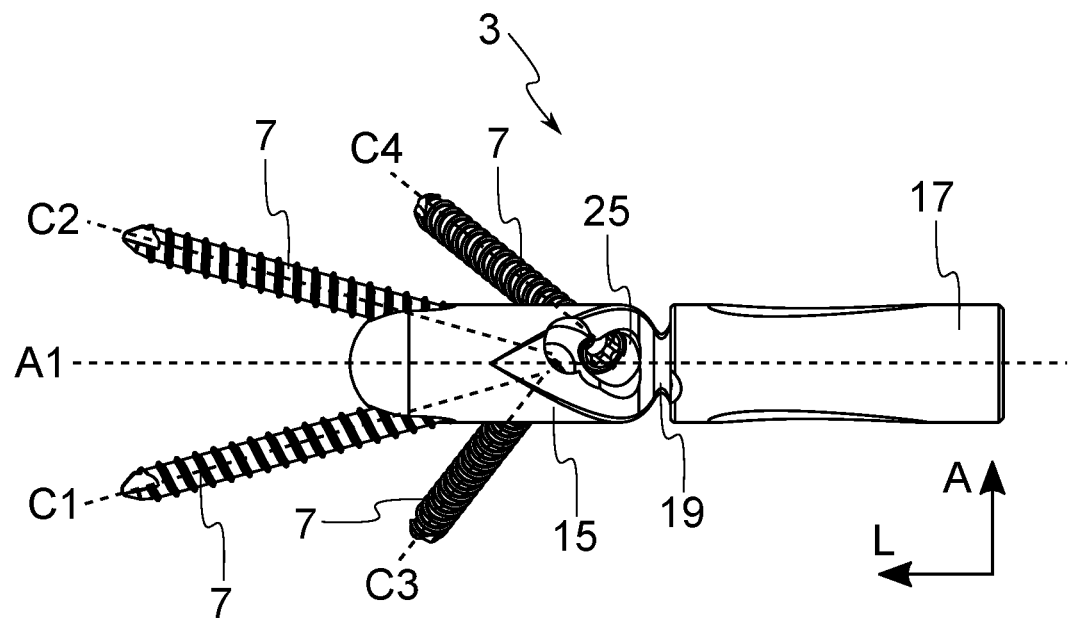
FIG. 10 is a top view of the fracture fixation device of FIG. 9.
Figure 11:
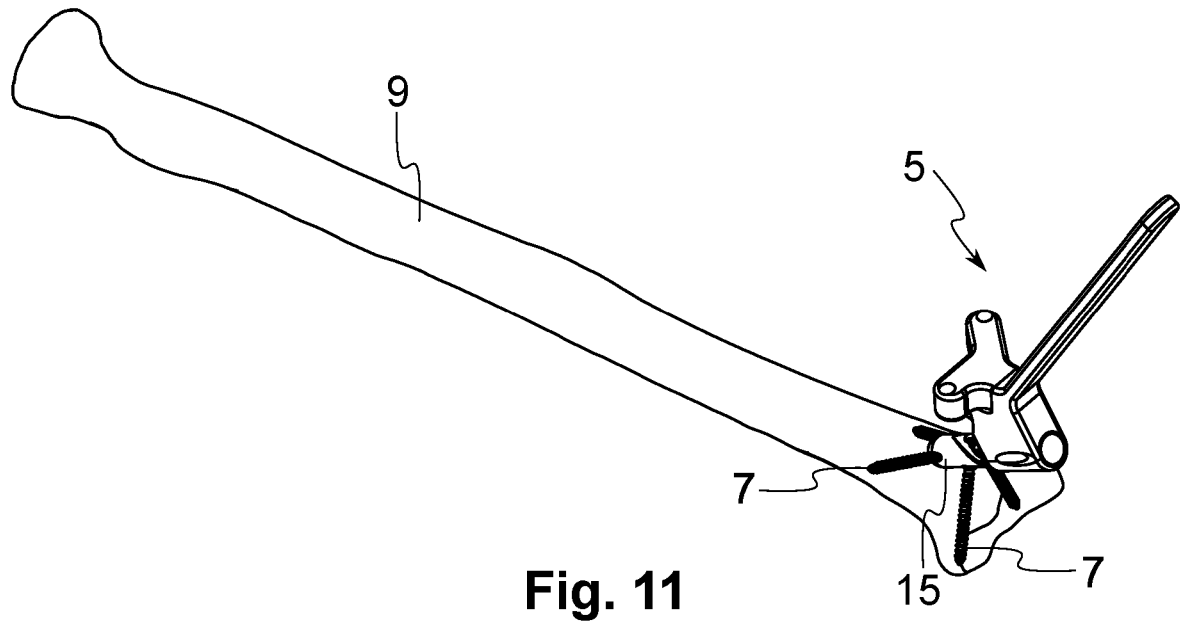
FIG. 11 is an isometric view illustrating the fracture fixation assembly of FIG. 8 when implanting the fracture fixation device into the target bone.

FIGS. 8 to 11 illustrate the fracture fixation assembly 1 and the fracture fixation device 3 according to the second embodiment of the present invention. Compared to the first embodiment, the difference is that the fracture fixation device according to the second embodiment does not comprise any tail portion. Thus, the fracture fixation device according to the second embodiment is not necessarily designed to extend along a length axis of a medullary canal of a bone. The fracture fixation device 3 may however at least partially penetrate into the medullary canal. More specifically, in the design shown in FIGS. 8 to 11, the body portion 15 is configured to be located in the bone but mainly outside of the medullary canal. However, one or more screws 7 may fully traverse the medullary canal in a direction substantially perpendicular to the length direction of the canal. Thus, the fracture fixation device 3 of the second embodiment may not be considered to be an intramedullary fixation device in the sense of the first embodiment. The term "intramedullary device" denotes an implant that resides at least partly in the medullary canal of the bone and more specifically an implant whose one element resides longitudinally in the medullary canal. Furthermore, as is better illustrated in FIG. 9, the orientations of the first and second channel axes C1, C2 are also slightly different compared to the orientations of these axes as shown for instance in FIG. 4. In FIG. 9, the first and second channel axes C1, C2 are in the plane defined by the lateral and longitudinal directions. However, other orientations would equally be possible, including the orientations shown in FIG. 4.

The fracture fixation device and/or the insertion device may be manufactured for example by 3-D printing or machining, and more specifically by milling and/or milling and turning. These devices may be of any suitable polymer, such as polyether ether ketone, or metal materials, such as titanium, titanium alloy, stainless steel or magnesium.

Figure 12:
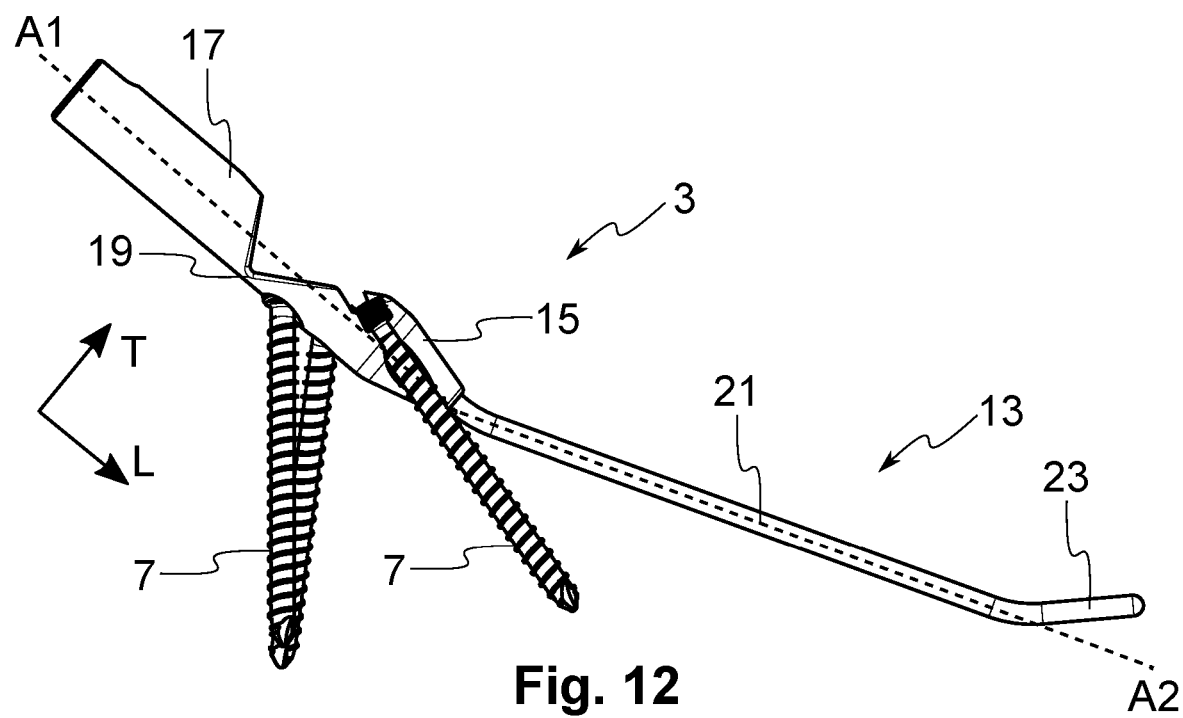
FIG. 12 is a side view of the fracture fixation device according to a third example embodiment of the present invention and further showing bone fixation elements.

FIGS. 12 to 16 illustrate the fracture fixation assembly 1 and the fracture fixation device 3 according to the third embodiment of the present invention. In this embodiment the tail portion 13 is not integrally formed with the body portion 15. In other words, the tail portion and the body portion do not form a monobloc element. Thus, the tail portion and the body portion can be easily decoupled from each other for instance after the implantation process has been completed if so desired. The tail portion may for example be connected to the body portion with a press-fit or form-fit connection. Other possible connections are for example screw-in or snap-in connections. Alternatively, the tail portion 13 and the body portion may be decoupled from each other by breaking up the connection point between these two elements. In this example, the first and second central axes A1, A2 are not parallel with respect to each other. As shown in FIG. 12, these axes have a given angle with respect to each other. This angle may be between 3° and 400 or more specifically between 3° and 30° or between 5° and 20°. The non-zero angle may further facilitate the implantation process.

Also, the orientations of the channel axes C1 to C4 are also slightly different compared to the other embodiments. To make the body portion 15 smaller than in the other embodiments, in the third embodiment at least one of the insertion channels 25 is located on the side of the body portion such that the at least one insertion channel is open along its length axis towards the outside. In other words, the body portion 15 does not entirely enclose the at least one insertion channel 25 along its length axis or along its central axis. In this example two of the insertion channels 25 are not fully enclosed by the body portion along their length axes.

Figure 13:
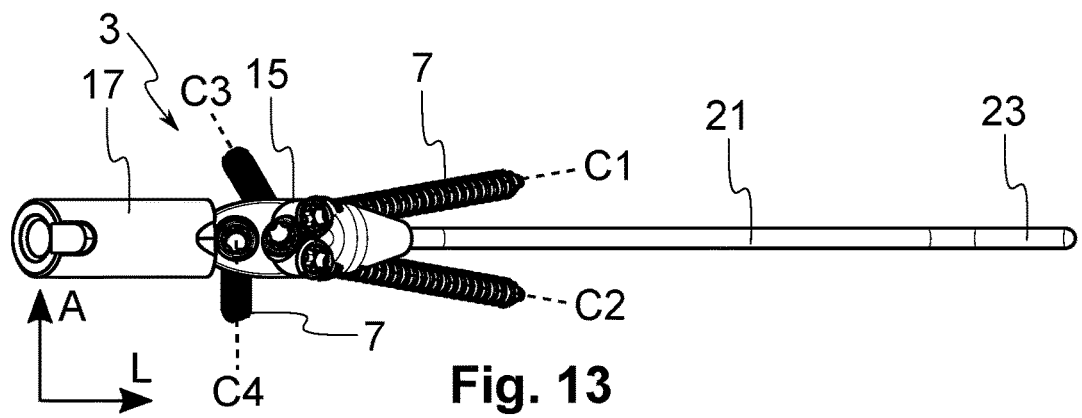
FIG. 13 is a top view of the fracture fixation device of FIG. 12.

Furthermore, the bone screws 7 when in the insertion channels point all downwards as opposed to the first embodiment, where two of the bone screws point upwards. Also in this embodiment the bone screws 7 when in the insertion channels 25 diverge in the target bone. This embodiment comprises two channel insertion points as shown in FIG. 13.

Figure 14:
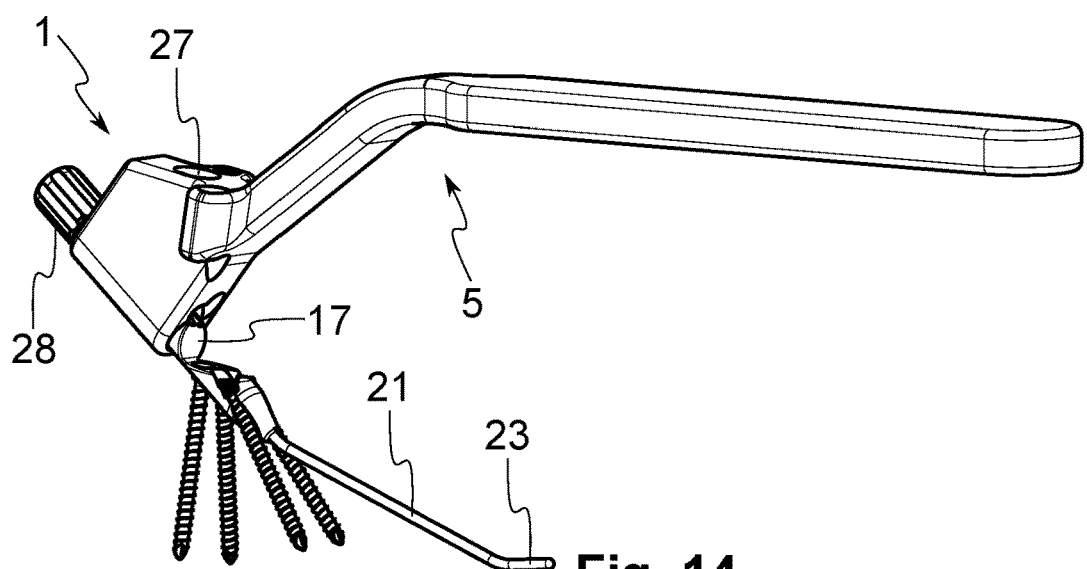
FIG. 14 is an isometric view illustrating a fracture fixation assembly according to the third embodiment of the present invention.

FIG. 14 also shows an insertion device fixation element 28, which in this example is a screw, for removably fixing the insertion device to the insertion device connection portion 17. More specifically, the screw 28 has an outer thread such that it can be threadedly engage an inner thread of a hollow channel of the insertion device connection portion 17. In this example the screw can be turned by hand and thus no tool is necessary for this purpose.

Two drill guides 29 are visible in FIG. 15. The purpose of these guides is to increase the rigidity of the fracture fixation device 3 especially during the implantation process. The tips of the drill guides 29 which come in contact with the target bone during the implantation process may have an outer thread such that the drill guides can be screwed into the insertion channels 25 by rotating the drill guides to form a firm connection between the fracture fixation device 3 and the drill guides 29. Alternatively, the connection may be a form-fit or press-fit connection. Once the drill guides are in place, drill bits may be inserted through the drill guides 29 so that holes can be drilled in the target bone 9 to receive the bone fixation elements 7.

It is further to be noted in the third embodiment, the length of the tail portion LT is smaller than the length of the tail portion according to the first embodiment. If the length of the fracture fixation device 3 is denoted as FL, then in the third embodiment LT<2×FT or more specifically LT is between 1×FT and 1.5×FT.

The implantation process of the bone fixation device 1 to treat a distal radius fracture is next briefly explained. According to this example, the method comprises:
- making or drilling an entry hole through a distal radius bone 9 and more specifically though a styloid process of the distal radius bone;
- inserting the fracture fixation device 1 through the entry hole until at least a portion of the fracture fixation device 3 (i.e. a portion of or the entire tail portion 13 is located in the intramedullary canal 11 of the distal radius bone;
- drilling holes into the distal radius bone 9 through the insertion channels 25 and through the drilling channels 27;
- inserting the bone fixation elements 7 into the drilled holes and fixing them therein to secure the bone fixation device in the fracture zone; and
- removing the insertion device connection portion 17 optionally together with the insertion device 5 from the body portion 15.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. Further embodiments may be obtained by combining any of the teachings described in connection with the above embodiments.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A distal radius fracture fixation assembly comprising a distal radius fracture fixation device for securing at least two bone segments together, and a separate insertion device comprising a handle for guiding the fracture fixation device to its implantation position, the insertion device being configured to be coupled to the fracture fixation device, the fracture fixation device comprising:
   - a body portion comprising at least two insertion channels each extending at least partially through the body portion and each being configured to receive a bone fixation element therethrough; and
   - an insertion device connection portion connected to the body portion, and for connecting the separate insertion device to the fracture fixation device, wherein the insertion device connection portion is integrally formed with the body portion and arranged to be decoupled from the body portion together with the insertion device,
   - wherein the insertion device comprises a hole shaped and dimensioned such as to receive the insertion device connection portion to allow the insertion device connection portion to be circumferentially enclosed by the insertion device when received in the hole, wherein the insertion device connection portion is configured to be received in the hole to removably couple the insertion device to the insertion device connection portion, and wherein the assembly further comprises a screw received in the hole in the insertion device and threadedly engaged in a channel in the insertion device connection portion for removably fixing the insertion device to the insertion device connection portion when the insertion device connection portion is received in the hole.

2. The assembly according to claim 1, wherein a bridging portion is located at a distal end of the body portion, wherein each one of the insertion channels defines an insertion channel axis, and wherein the insertion channel axes are oriented from the distal end towards a proximal end of the body portion.

3. The assembly according to claim 1, wherein each one of the insertion channels defines an insertion channel axis, and wherein the insertion channel axes diverge in a target bone.

4. The assembly according to claim 3, wherein the insertion channel axes diverge from a vertical plane of the fracture fixation device.

5. The assembly according to claim 1, wherein each one of the insertion channels defines an insertion channel axis, and wherein the insertion channel axes or their respective extension cross a central axis of the body portion once.

6. The assembly according to claim 1, wherein each one of the insertion channels defines an insertion channel axis, and wherein at least one of the channels forms an angle between 1° and 20° with respect to a medial-lateral plane of the fracture fixation device, and wherein at least another channel forms an angle between 30° and 90° with respect to the medial-lateral plane.

7. The assembly according to claim 1, wherein the number of insertion channels is four.

8. The assembly according to claim 1, wherein the fracture fixation device further comprises an elongated tail portion extending from the body portion and connected to it, and wherein the tail portion is configured to be inserted into a medullary canal of a target bone.

9. The assembly according to claim 8, wherein the body portion defines a first central axis, while the tail portion defines a second central axis, and wherein the first and second central axes are substantially parallel but non-coaxial.

10. The assembly according to claim 8, wherein the body portion defines a first central axis, while the tail portion defines a second central axis, and wherein the first central axis is angled with respect to the second central axis.

11. The assembly according to claim 8, wherein the tail portion is configured to be decoupled from the body portion.

12. The assembly according to claim 8, wherein the tail portion is not integrally formed with the body portion.

13. The assembly according to claim 8, wherein the tail portion comprises a first tail portion, which is substantially straight in a non-implanted state.

14. The assembly according to claim 13, wherein a distal end of the first tail portion merges with a proximal end of the body portion, and wherein a proximal end of the first tail portion is rounded or chamfered.

15. The assembly according to claim 13, wherein the fracture fixation device further comprises a second tail portion, which is substantially straight in a non-implanted state, the second tail portion merging with the first tail portion such that the second tail portion is angled with respect to the first tail portion.

16. The assembly according to claim 1, wherein the insertion channels extend between one single insertion point and a number of exit points, the number of exit points equaling the number of insertion channels.

17. The assembly according to claim 1, wherein the insertion channels extend between two insertion points and a number of exit points, the number of exit points equaling the number of insertion channels.

18. The assembly according to claim 1, wherein at least one of the insertion channels is not longitudinally fully enclosed by the body portion.

19. The assembly according to claim 1, wherein the assembly further comprises one or more removable rigidifying elements linking the insertion device to the body portion to increase the rigidity of the bone fracture fixation device.

20. The assembly according to claim 19, wherein the one or more removable rigidifying elements are drill guides.

21. A method of treating a distal radius fracture by using the assembly according to claim 1, the method comprising:
    making an entry hole through a distal radius bone;
    inserting the fracture fixation device through the entry hole until at least a portion of the fracture fixation device is located in a medullary canal of the distal radius bone;
    drilling holes into the distal radius bone through the at least two insertion channels;
    inserting the bone fixation elements into the drilled holes; and
    removing the insertion device connection portion from the body portion.

22. The assembly according to claim 1, wherein the insertion device connection portion is integrally formed with the body portion via a bridging portion, which is arranged to be broken when a force is exerted thereon to decouple the insertion device connection portion from the body portion.

23. The assembly according to claim 22, wherein the insertion device connection portion is a snap-off element.

* * * * *